United States Patent [19]

Trajmar

[11] Patent Number: 4,704,197

[45] Date of Patent: Nov. 3, 1987

[54] ISOTOPE SEPARATION USING TUNED LASER AND ELECTRON BEAM

[75] Inventor: Sandor Trajmar, Pasadena, Calif.

[73] Assignee: The United States of America as represented by the Administrator of the National Aeronautics and Space Administration, Washington, D.C.

[21] Appl. No.: 930,217

[22] Filed: Nov. 13, 1986

[51] Int. Cl.$^4$ .................. B01D 59/34; H01J 27/00
[52] U.S. Cl. ..................... 204/157.22; 250/423 P;
   250/427
[58] Field of Search ............. 204/157.22; 250/427,
   250/423 P

[56] References Cited

U.S. PATENT DOCUMENTS

| | | | |
|---|---|---|---|
| 3,939,354 | 2/1976 | Janes | 204/157.22 X |
| 3,953,731 | 4/1976 | Forsen | 250/290 |
| 3,959,649 | 5/1976 | Forsen | 250/299 |
| 4,020,350 | 4/1977 | Ducas | 204/157.22 X |
| 4,031,389 | 6/1972 | Russell et al. | 250/283 |
| 4,115,078 | 9/1978 | Janner et al. | 250/423 P X |
| 4,302,676 | 11/1981 | Levin et al. | 250/423 P X |
| 4,451,437 | 5/1984 | Meyer-Kretschmer et al. | 423/3 |

OTHER PUBLICATIONS

Tam, W. and Wong, S. F., "Magnetically Collimated Electron Impact Spectrometer", *Rev. Sci. Instrum.*, 50(3), Mar. 1979, pp. 302–307.

*Primary Examiner*—John F. Terapane
*Assistant Examiner*—Virginia B. Caress
*Attorney, Agent, or Firm*—Paul F. McCaul; John R. Manning; Thomas H. Jones

[57] ABSTRACT

Apparatus and method for producing a stream (56) of a selected isotope. The apparatus comprises means for producing an atomic beam (26) containing the isotope of interest and other isotopes. Means (48) are provided for producing a magnetic field (28) traversing the path of the atomic beam of an intensity sufficient to broaden the energy domain of the various individual magnetic sublevels of the isotope of interest and having the atomic beam passing therethrough. A laser beam (32) is produced of a frequency and polarization selected to maximize the activation of only individual magnetic sublevels of the isotope of interest within the portion of its broadened energy domain most removed from other isotopes within the stream. The laser beam is directed so as to strike the atomic beam within the magnetic field and traverse the path of the atomic beam whereby only the isotope of interest is activated by the laser beam. The apparatus further includes means (40, 44, 46, 28) for producing a collimated and high intensity beam of electrons (42) of narrow energy distribution within the magnetic field which is aimed so as to strike the atomic beam while the atomic beam is simultaneously struck by the laser beam and at an energy level selected to ionize the activated isotope of interest but not ground state species included therewith. Deflection means (54) are disposed in the usual manner to collect the ions.

2 Claims, 7 Drawing Figures

ISOTOPE SEPARATION USING TUNED LASER AND ELECTRON BEAM

ORIGIN OF THE INVENTION

The invention described herein was made in the performance of work under a NASA contract and is subject to the provisions of Public Law 96-517 (35 USC 202) in which the Contractor has elected not to retain title.

DESCRIPTION

1. TECHNICAL FIELD

The present invention relates to methods and apparatus for producing a stream of ions of a selected isotope of an atom and, more particularly to a method and apparatus for accomplishing the steps of producing an atomic beam containing the ions of the isotope of interest; producing a magnetic field traversing the path of the atomic beam of sufficient intensity to split and shift the magnetic substates of the various isotopes in such a way that a level of the isotope of interest is well separated from those of the others and at the same time achieving the collimation of an electron beam contained therein; producing a laser beam of proper frequency to cause the activation of only the state of the isotope of interest which is most removed from other isotopes present in the beam; adjusting the polarization of the laser beam to further maximize the activation of only the state of the isotope of interest most removed from other isotopes in the beam; aiming the laser beam to strike the atomic beam within the magnetic field and traverse the path of the atomic beam whereby only the isotope of interest is activated by the laser beam; producing a collimated, energy selected, high-flux beam of electrons which propagates along the magnetic field and aimed to strike the atomic beam which is being simultaneously excited by the laser beam and at a kinetic energy sufficient for ionizing the activated isotope of interest but not the other unactivated isotope atoms; and, disposing deflection means to have the atomic beam containing a mixture of ions and neutral atoms pass therethrough and deflect the ionized isotope from the remainder of the beam to form a separate stream composed only of the isotope of interest.

2. Description of the Prior Art

A number of methods have been proposed to separate specific isotopes of elements from mixtures containing various isotopes in their natural abundance ratios. The present invention is related only to those methods which utilize laser excitation for selectively exciting the elemental isotope and subsequent electron impact ionization to achieve the separation of the elemental isotope. Two principal examples of prior art apparatus intended to accomplish this end, which are somewhat similar to the present method and associated apparatus and therefore the most relevant herto, are shown in the Letters Patent of Russell et al. U.S. Pat. No. (4,031,389) entitled ISOTOPE SEPARATION USING METALLIC VAPOR LASERS and Meyer-Kretschmer et al. U.S. Pat. No. (4,451,437) entitled METHOD FOR SEPARATING DIFFERENT ISOTOPES IN COMPOUNDS BY MEANS OF LASER RADIATION. While such prior art apparatus and the methods employed therein work somewhat for their purpose, they suffer from one or both of two major drawbacks—lack of high selectivity and high cost. These shortcomings of the prior art can best be seen from an inspection of the above-described patents and their teachings in view of the physical environment of particular concern.

The goal to be achieved by the method and apparatus of the present invention and in the isotope separation schemes of the above-mentioned two patents is two-fold—selective activation of the desired isotope and ionization of the activated isotope. The laser is used to selectively activate the isotope of interest and then electrons are used to ionize the activated isotope. The three schemes, however, differ very significantly as to how the selective excitation by the laser and the ionization by the electrons are achieved and this, in turn, has critical consequences concerning the isotope separation efficiency and cost.

Figure 1:
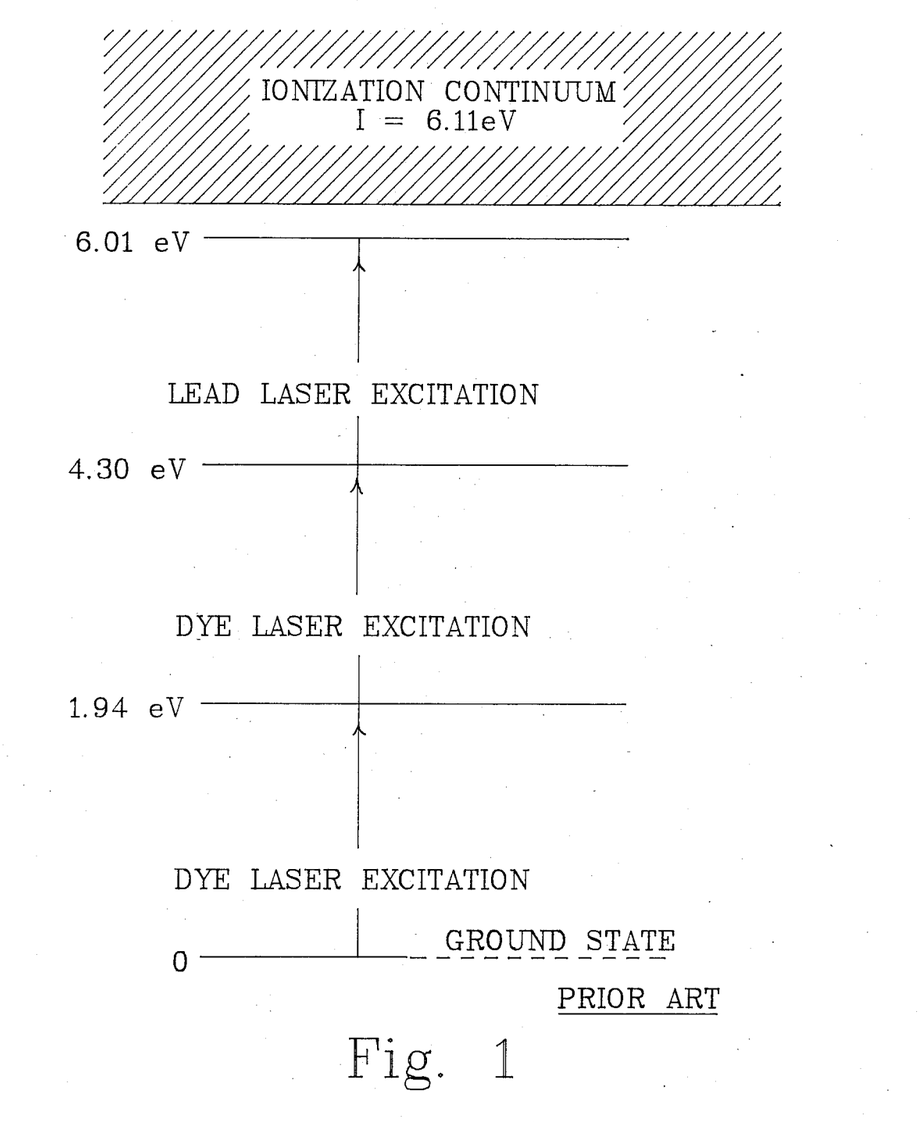
FIG. 1 is a simplified drawing corresponding substantially to FIG. 4 of the Russel et al. patent and refers to the separation of $^{235}U$ from a naturally occurring mixture of $^{235}U$ and $^{238}U$ mixture showing the prior art technique of using multiple laser to increase the activation of isotopes towards the ionization threshold prior to electron bombardment to cause ionization.

A look at FIG. 1 (which corresponds to a great degree to FIG. 4 of the Russell et al. patent and refers to the separation of $^{235}U$ from a naturally occurring mixture of $^{235}U$ and $^{238}U$) makes the reason for the low separation efficiency and high cost of this approach readily apparent. First, three laser excitation steps (requiring three different lasers) are applied to achieve the excitation of the selected isotope. The overall excitation efficiency factor will be the product of the efficiency factors of the three individual steps (all of them much smaller than unity). Second, the ionization is achieved by plasma electrons present in the heated gas and/or by auxiliary discharge having uncontrolled energy and broad energy distribution peaking at very low kinetic energy. Although these electrons will predominantly ionize the highly excited isotope, they are also capable of causing other processes which ruin the selectively of the isotope separation scheme. Low-energy electrons have large cross sections for superelastic collisions and will thus work against the laser excitation. Furthermore, both the superelastic electrons and the high-energy tail of the plasma (or discharge) electrons could initiate excitation and/or ionization of unwanted isotopes. The utilization of three laser pumping steps and the inefficiency of the overall scheme is, of course, reflected in the cost of the procedure.

Figure 2:
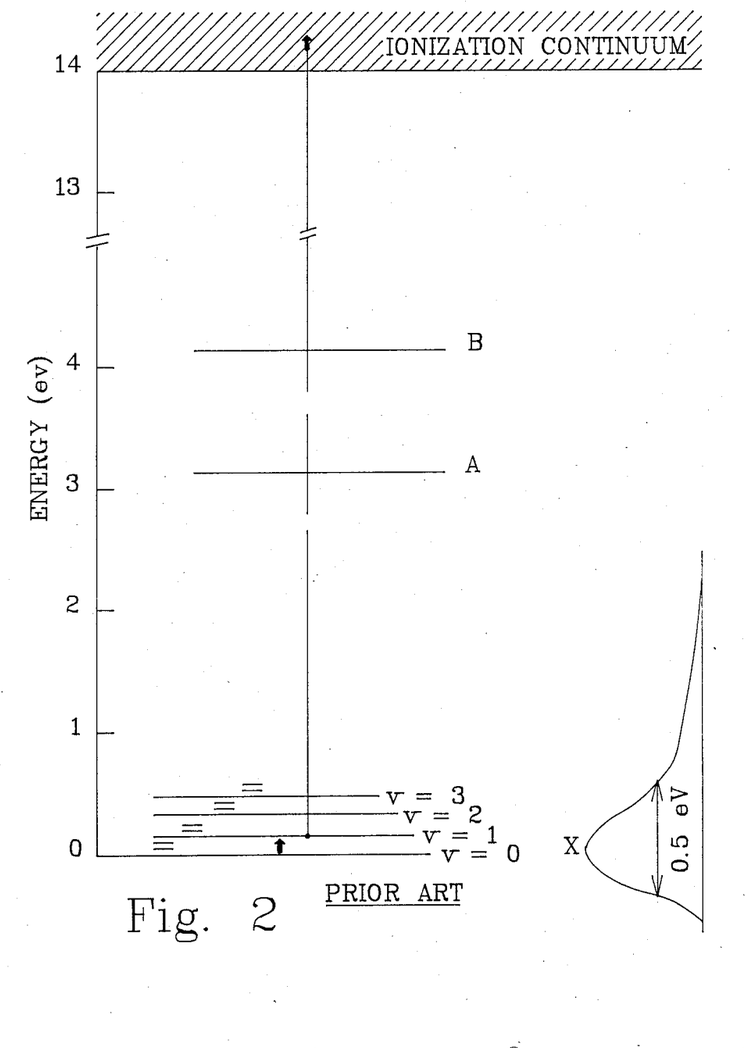
FIG. 2 is a simplified drawing of the method of the Meyer-Kretschmer et al. patent to substantially the same scale as the drawing of FIG. 1 to allow comparison of the two schemes.

FIG. 2 demonstrates the Meyer-Kretschmer et al. scheme. The energy scale of the figure was made relatively the same as that of FIG. 1 to facilitate comparison; and, it depicts in a simplified way $UF_6$, which is the subject of the Meyer-Kretschmer et al. patent. The vibrational ($v = 0, 1, \ldots$) and rotational levels (smallest steps) are schematically indicated. The ground electronic state designated as X and a couple (A and B) of the excited electronic states, out of the many actual states, are shown. An infrared laser is utilized to selectively excite a vibrational state of the desired isotope (indicated by heavy line), then an electron beam obtained from a thermoionic source (or from discharge) without energy selection and accelerated to greater than 13 eV kinetic energy preferentially ionizes the vibrationally excited species (indicated by light line). A typical electron energy distribution associated with these electrons is shown on the right hand side of the figure as it is viewed. The major problem with this scheme is the low degree of overall selectivity. The vibrational excitation energy is small (typically in the order of a tenth of an eV) and the electrons are capable of ionizing all the ground state isotopes as well as the excited isotope. The enhancement is obtained because of the cross section for ionization of vibrationally excited species is larger than that of the ground state (in the case of $UF_6$ the two cross sections differ by a factor of about ten). The electrons can also interact in a large variety of ways (e.g., disassociative attachment, excitation, etc.) with all isotopes and these interactions can lead to serious deterioration of the selection efficiency. An additional disadvantage connected with the molecular approach is the need to cool the sample. This all naturally reflects, once again, on the economics of the separation process.

There is no method and apparatus in the prior art providing isotope separation by laser excitation and electron ionization which has good selectivity and economics.

DISCLOSURE OF THE INVENTION

The present invention provides isotope separation by laser excitation and electron ionization in a manner which has good selectivity and economics. The scheme applies two main novel concepts: (1) The use of a magnetic field to (a) shift the magnetic sublevels, (b) collimate the electron beam, and (c) achieve energy selection of the electron beam; and, (2) Polarization of the laser light to further enhance the selectivity.

High selectivity and economy have been attained by the apparatus of the present invention for producing and separating a stream of a selected isotope from an atomic beam containing a mixture of isotopes comprising: means for producing an atomic beam containing the isotope of interest and other isotopes; means for producing a magnetic field traversing the path of the atomic beam of a magnetic flux level sufficient to broaden the energy domain of the individual magnetic sublevels of the isotope of interest and having the atomic beam passing therethrough; means for producing a laser beam of a frequency selected to maximize the activation of only individual magnetic sublevels of the isotope of interest within the portion of its broadened energy domain most removed from other isotopes within the beam; means for adjusting the polarization of the laser beam to further maximize the activation of only individual magnetic sublevels of the isotope of interest within the portion of its broadened energy domain most removed from other isotopes within the beam; means for aiming the laser beam to strike the atomic beam within the magnetic field and traverse the path of the atomic beam whereby only the isotope of interest is activated by the laser beam; means for producing a collimated and high flux beam of electrons within the magnetic field aimed to strike the atomic beam which is struck simultaneously by the laser beam and at an energy level sufficient for ionizing the activated isotope of interest but not ground state species; and, deflection means disposed to have the atomic beam pass therethrough after being struck by the electron beam for deflecting the ionized isotope from the remainder of the beam to form a separate stream composed only of the isotope of interest.

DETAILED DESCRIPTION OF THE DRAWINGS

DETAILED DESCRIPTION OF THE INVENTION

The present scheme has been tested on and will be described hereinafter for the element Barium (Ba) and the separation of the 138 isotope of this element from the naturally occuring isotope mixture. The same principles, of course, can be applied to other elements.

Figure 3:
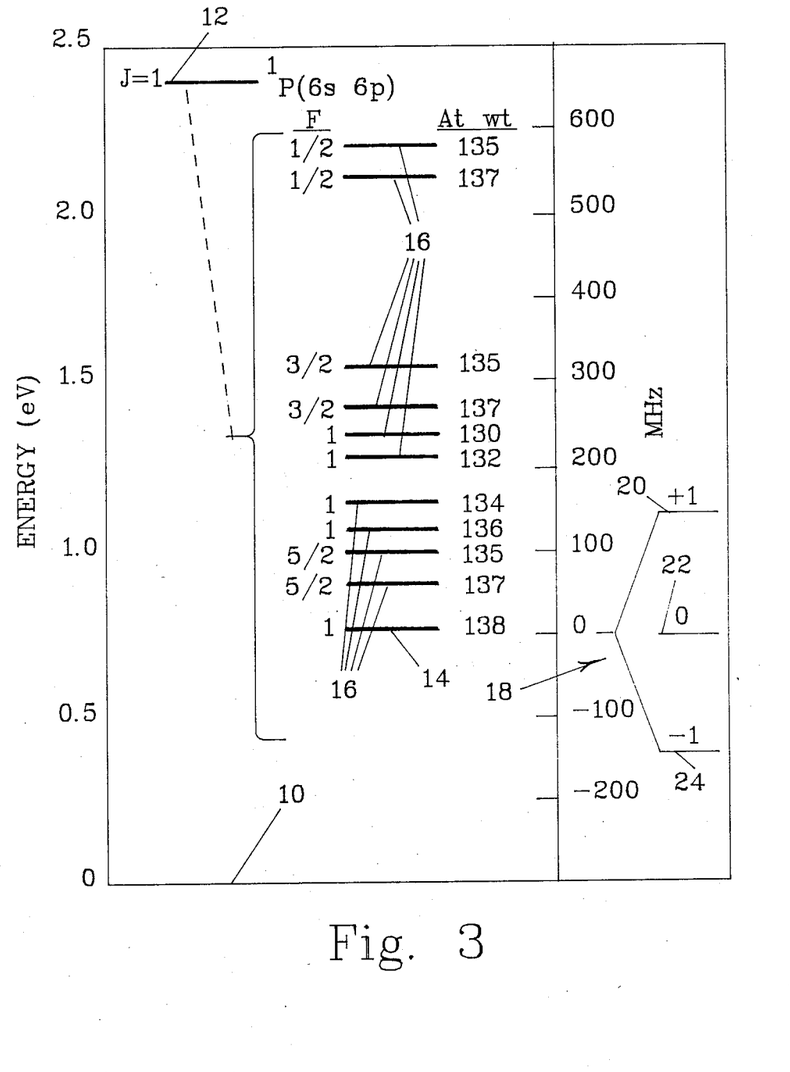
FIG. 3 is a partial energy level diagram of Ba in the absence of an electric or magnetic field (left side) and the Zeeman splitting for $^{138}Ba$ in the presence of a 100 Gauss magnetic field (right side).

The underlying principle upon which the present invention is founded is shown in the energy diagram of FIG. 3. In naturally occuring Barium, the isotopes with atomic mass units 138, 137, 136, 135, 134, 132, and 130 are present in 71.66, 11.32, 7.81, 6.59, 2.42, 0.10, and 0.10% abundance, respectively. The nuclear spin for the even isotopes is zero and for the odd isotopes is 3/2. The partial energy diagram in the absence of electric or magnetic field as well as the Zeeman splitting for $^{138}Ba$ in the presence of a 100 Gauss magnetic field are shown in the figure. In the absence of external perturbation, all isotopes are in their electronic ground state (the line indicated as 10 in the figure) but can be excited by electromagnetic perturbation (e.g. laser beam) to excited levels, such as the $^1P$ level indicated as 12. Each even isotope exists in three individual magnetic sublevels —"+1", "0", and "−1". In the absence of electric or magnetic activation, they are superimposed upon one another such as indicated by the line 14 of FIG. 3; that is, if one would subject the $^{138}Ba$ isotope to a laser beam of such well defined frequency which matches the energy of this level represented by the narrow line 14, only $^{138}Ba$ would be activated thereby, but not the other isotopes indicated the lines 16. Such is not always practical, however. For some elements, the energy level spacings are very small and the known laser technology cannot produce a laser beam (at least within practical cost limitations) of sufficiently narrow frequency width.

If the isotopes to be selected are placed within a magnetic field of sufficient strength however (e.g. the applicant has successfully employed a magnetic field of 100 Gauss in the case of Ba for this purpose), the response domains for the three superimposed individual magnetic sublevels will be both spread and shifted from the original degenerate level as generally indicated at 18 in FIG. 3. As can be seen in the energy diagram of FIG. 3 at 18, the response domains for the three individual magnetic sublevels "+1", "0", and "−1" are shifted and spread to the values indicated by the lines 20, 22, and 24, respectively. As can be seen and appreciated, the "−1" individual magnetic sublevel of the $^{138}$Ba isotope, as indicated by line 24, responds to and is activated by a frequency domain far enough removed from the other isotopes and the $^{138}$Ba "+1" and "0" individual magnetic sublevels to make selective activation of the "−1" very practical using standard equipment which is readily available. The method and apparatus for accomplishing the foregoing as successfully employed by the applicant herein in laboratory tests will now be described in detail.

Figure 4:
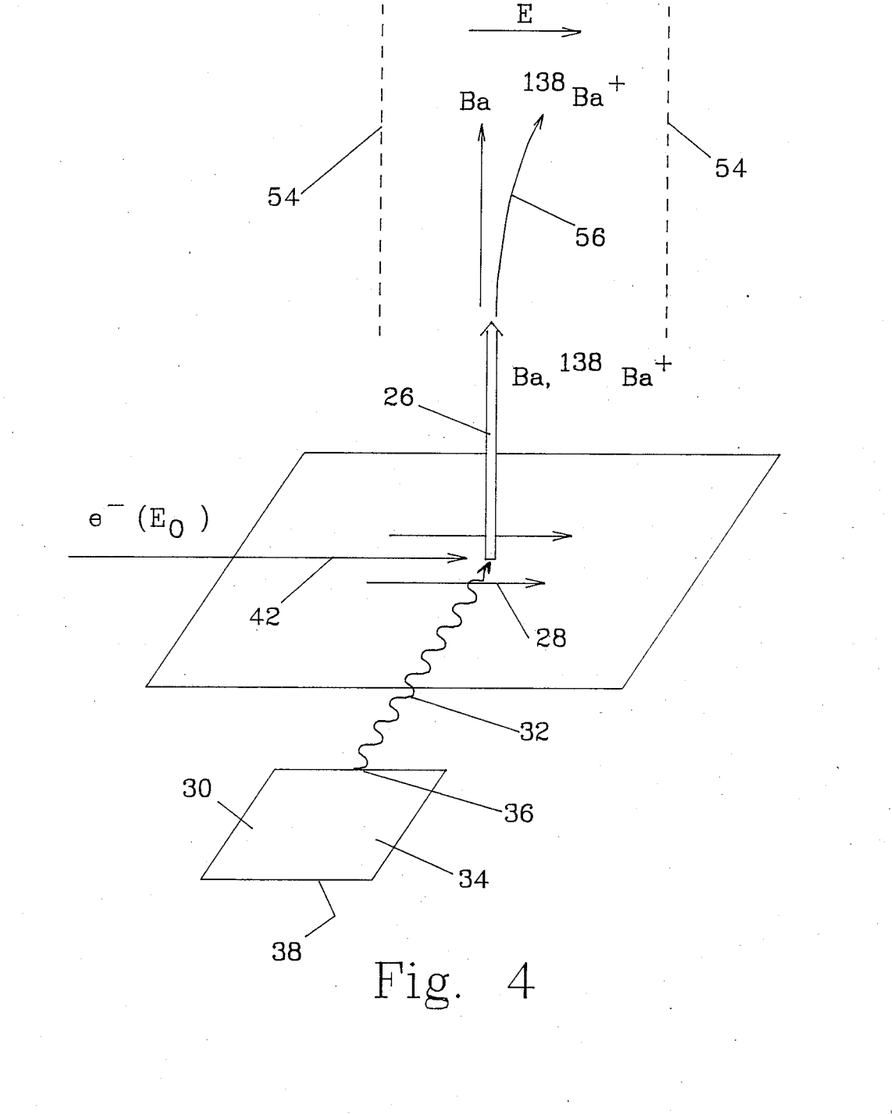
FIG. 4 is a simplified diagram showing the method and apparatus of the present invention.
Figure 5:
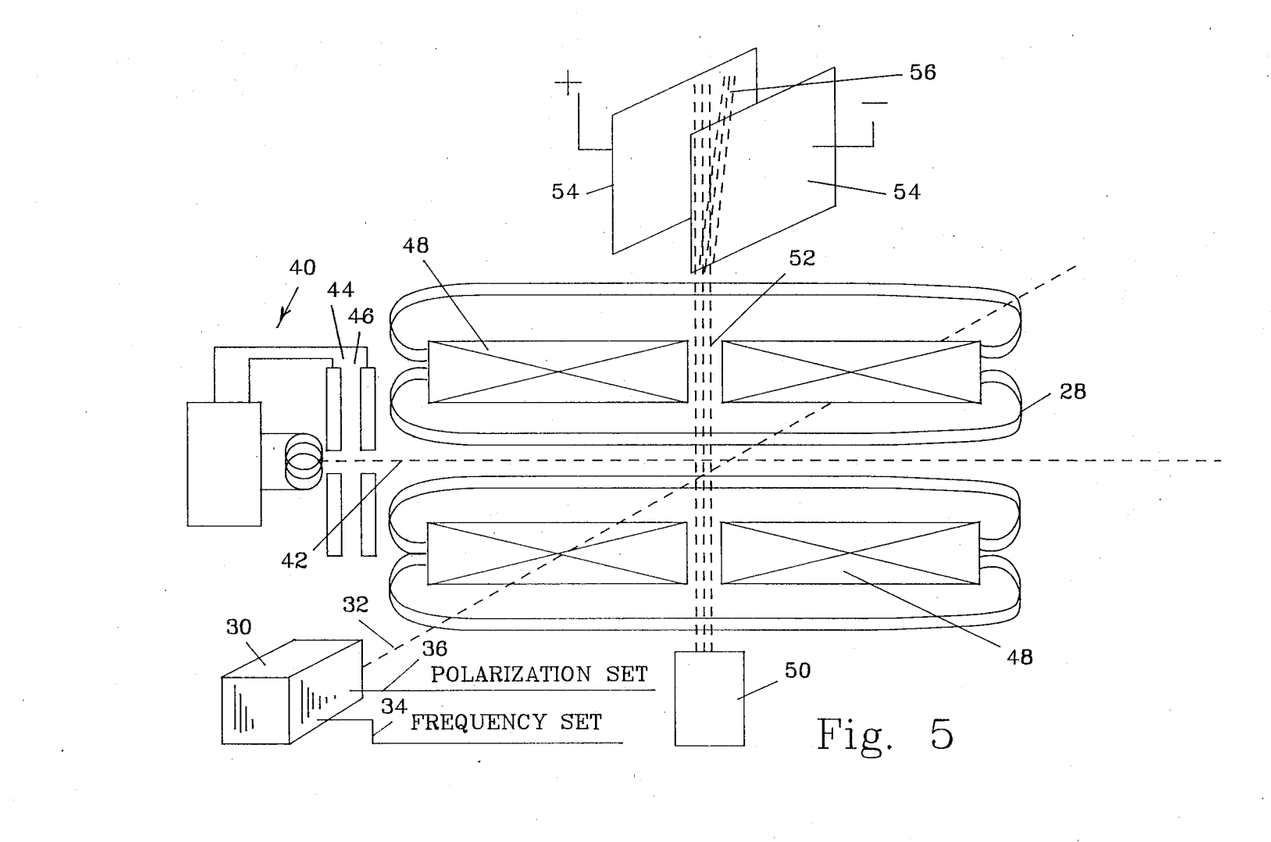
FIG. 5 is a more detailed yet simplified drawing showing the apparatus of the present invention by which the atomic beam is struck within the magnetic field at right angles to the path of the atomic beam by the laser beam and by the electron beam.

The apparatus of the present invention is shown in simplified form in the representation of FIG. 4. A more detailed drawing of the essential portions is shown in FIG. 5. An atomic beam 26 containing the isotope of interest is created moving in the desired direction. Such beams and the manner of producing them are well known to those skilled in the art and, therefore, the atomic beam 26 will not be described in further detail in the interest of simplicity and the avoiding of redundancy. Other aspects of the present invention which are known in the art and not part of the novelty of the present invention per se will be treated in like manner.

A magnetic field 28 is produced in known manner and positioned to have the atomic beam 26 pass therethrough at right angles. During the time that the atomic beam 26 is passing through the magnetic field 28, the isotopes therein have their individual response domains shifted and spread in the manner described above with respect to FIG. 3 as a result of the Zeeman splitting produced by the magnetic field. At 30 is a laser producing a laser beam 32. The laser 30 includes frequency adjusting means 34 and polarization adjusting means 36 by which the polarization of the laser beam 32 can be selectively set. Both means 34 and 36 are well known to those skilled in the laser art. The laser 30 is mounted on aiming or pointing means 38 by which the laser beam 32 is directed into the magnetic field 28 to strike the atomic beam 26 therein, traversing its direction of travel in the usual manner for causing excitation within a moving beam by the use of a laser beam. In this case, however, the frequency of the laser beam 32 is selected by means 34 and the polarization of the laser beam 32 is set by means 36 such as to, in each case, maximize the activation of the individual magnetic sublevel of the isotope of interest in the resonance domain which is most removed from the other isotopes and individual magnetic sublevels. For example, going back to the energy diagram of FIG. 3, the frequency of the laser beam 32 would be set to the level of line 24 (i.e. the "−1" individual magnetic sublevel of the $^{138}$Ba isotope) which would maximize activation from the frequency point of view. The polarization of the laser beam 32 would, in like manner, be set such as to further maximize the activation at that frequency. Thus, it can be seen that the method and apparatus of the present invention first employs a selective frequency for the laser beam 32 and then further employs a selective polarization for it as well. The result is a very selective process of activation of the isotope of interest with but a single stage of laser bombardment.

The magnetic field 28 of the present invention is of a strength and position such as to conveniently provide two additional benefits within the present invention. As is well known, like electrical charges repel one another. Thus, any moving beam of electrons, without more, will tend to spread apart, thus severely limiting the electron current level of the beam. It is also well known, however, that by placing an electron beam within a magnetic field, it can be kept collimated and its electron current can be increased. The other benefit is that the presence of the magnetic filed offers a convenient method for narrowing the energy distribution of the electron beam by utilizing the so-called trochoidal electron gun principle. This principle was used in the applicant's experimentation and has been described in detail in the following publications for those who wish further information thereon—A. Stamatovic and G. J. Schulz, The Rev. of Sci. Instr. 41, 423 (1970); W. C. Tam and S. F. Wong, Rev. Sci. Instrum., 50, 302 (1979). While not considered as prior art to the present invention, copies of the forgoing are filed herewith for inclusion in the filewrapper to be available to those having interest and no access to a copy thereof. It should also be noted in passing that narrowing of the energy distribution of the electron beam may or may not be necessary in each case depending on the atomic system involved. The present invention takes advantage of the above-described phenomenon by employing a conventional source 40 producing a high density electron beam 42. The source 40 includes energy adjusting means 44 whereby the kinetic energy and energy distribution width of the electron beam 42 can be set. Using means 44, in the present invention, the electron beam 42 is set to be of kinetic energy which is sufficient to ionize excited atoms but not the ground state atoms and of narrow width so as to be more selective in the ionization process. The source 40 also includes aiming means 46 by means of which the electron beam 42 can be pointed or directed. A pair of coils 48 connected to an appropriate source of power (not shown) are employed to produce the magnetic field 28. The electron beam is directed down and propagates along the field 28 as best seen in FIG. 5. The atomic beam 26 from its source 50 is directed through space 52 between the coils 48 so as to be at right angles to both the electron beam 42 and the magnetic field 28. The laser 30 is also positioned to have its beam 32 pass through the space 52 so as to strike the atomic beam 26 at right angles thereto. The electron beam 42 traverses the stream's direction of travel and causes the isotopes activated by the laser beam 32 to be ionized by the electron beam 42 striking the activated isotopes and dislodging electrons therefrom. Trajectory calculations by applicant show that the ion beam will not be significantly affected by the presence of the magnetic field and the ions generated in the interaction region will travel in the direction of the original atomic beam.

Subsequent to the ionization process, the atomic beam 26 passes through a pair of electrostatic plates 54 connected, repetively to positive (+) and negative (−) electrical sources so as to deflect the ionized isotopes and thereby form a separate stream 56 of the isotopes of interest.

Figure 6:
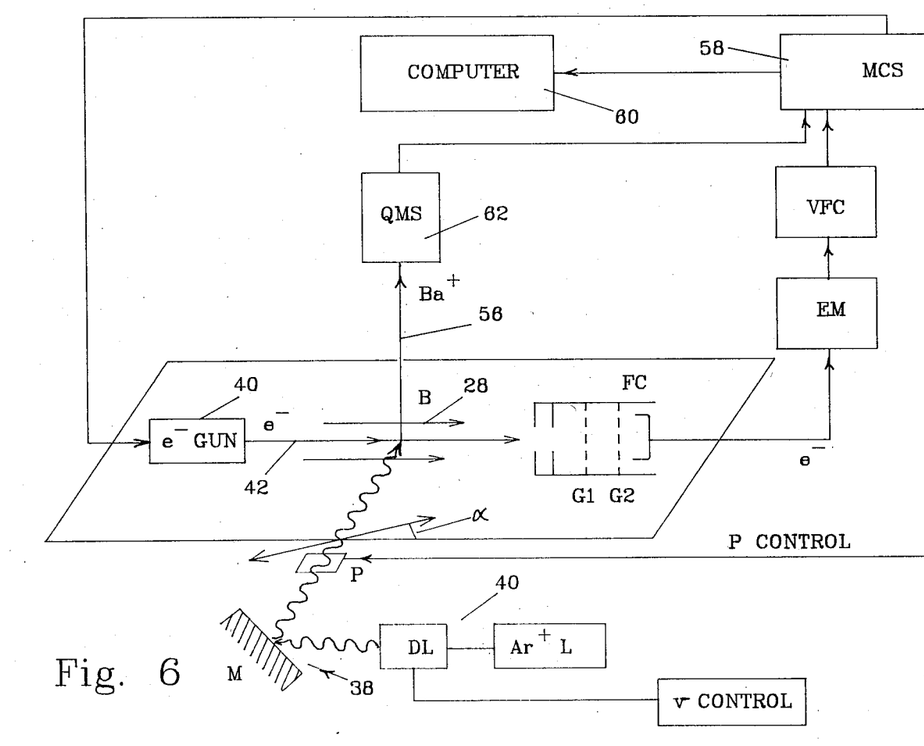
FIG. 6 is a simplified diagram showing the method and apparatus of the present invention and the manner in which it was tested in the laboratory to prove its improved operability.

The manner in which the foregoing described method and apparatus were tested in the laboratory to prove the improved operation thereof is shown in FIG. 6. The collimated Ba beam was crossed with an energy-selected ($\Delta E_{\frac{1}{2}} = 300$ meV) electron beam at 90° angle. The laser beam (20 mW cw, single mode) was introduced in a direction which was perpendicular to both the atomic and to the electron beams (as depicted in FIGS. 4 and 5) and it could be moved to cross the Ba beam by the aiming mirror (M) 38 below, at the center, or above the electron beam ionization region, corresponding to "laser low", "laser center", and "laser high" geometrics. The polarization and frequency of the laser beam were controlled and could be varied continuously. The overall control and data handling were achieved by a Multi Channel Scaler 58 and a computer 60. The laser beam excited a selected magnetic sublevel of a hyperfine level in the $^1P_1$ manifold. Spontaneous emission then populated the lower lying $^1D_2$, $^3D_2$, and $^3D_1$ levels. Cascade to other levels was neglected. Ions of the desired isotope were detected by a quadrupole mass spectrometer 62.

The experimental arrangement shown in FIG. 6 made it possible to study the laser excitation process, the electron impact ionization of the various isotopes and laser-prepared states, the cross sections associated with ionization of various states and the selectivity of the procedure. It was found that: (a) magnetic sublevels of a specific isotope can be pumped very selectively (no measurable excitation of other than the selected level, estimated that much less than 1% undesired pumping); (b) electron impact ionization occurred only for the selected and excited isotope (no measurable ion signal on other isotopes, much less 1% undesired isotopic ions); and, (c) the ionization probabilities for the excited states were much higher than for ground state atoms, giving further increase in selectivity of the separation process.

Figure 7:
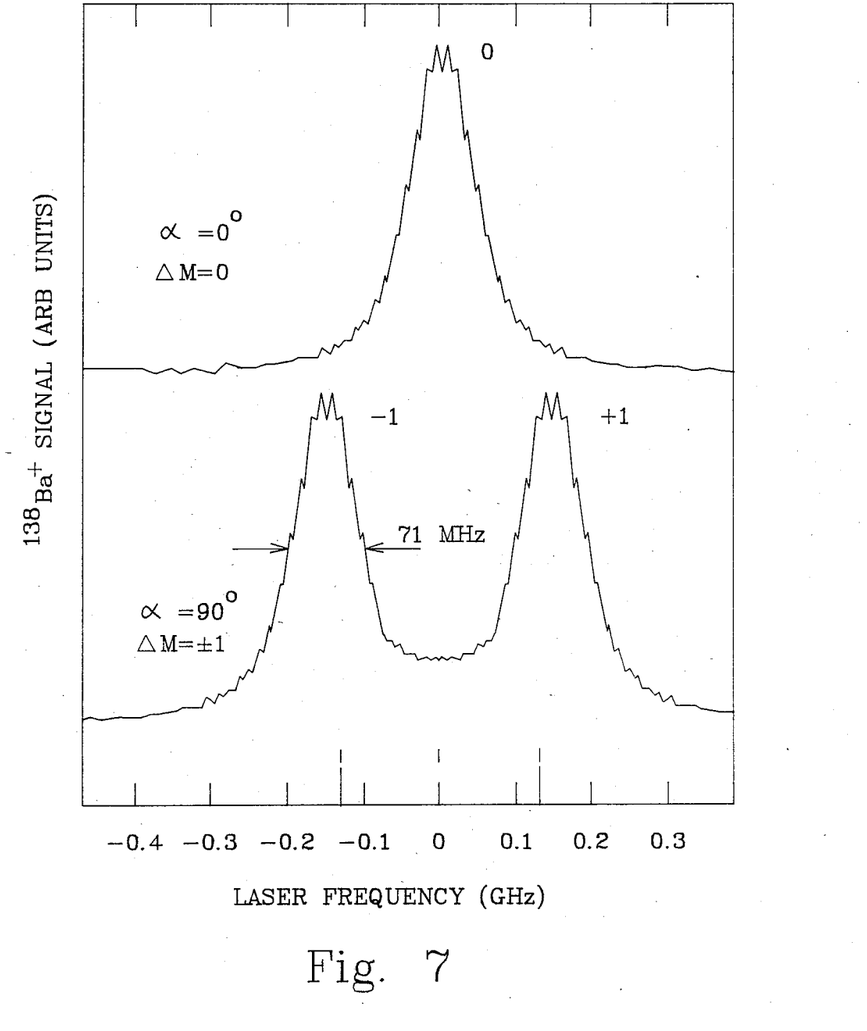
FIG. 7 is a drawing demonstrating the laser wave length and polarization selectivity of the ionization process according to the present invention.

The frequency and polarization selectivity in producing the desired ions is demonstrated in FIG. 7. Both the frequency and the polarization have to be correct for producing ions of the selected isotope. It can be seen that the frequency requirement is satisfied only over a frequency region smaller than the spacing of the magnetic sublevels; and, even when the frequency requirement is satisfied, improper polarization completely eliminates the ion signal. This double condition greatly increases the selectivity of the isotope separation process of the present invention.

Thus, it can be seen that the present invention has truly provided a method and apparatus capable of easy and highly selective separation of an isotope of interest employing only a single laser.

I claim:

1. The method for producing and separating a stream of a selected isotope from an atomic beam containing a mixture of isotopes comprising the steps of:
   (a) producing an atomic beam containing the isotope of interest and other isotopes;
   (b) producing a magnetic field traversing the path of the atomic beam of a magnetic flux level sufficient to broaden the energy domain of the individual magnetic sublevels of the isotope of interest and having the atomic beam passing therethrough;
   (c) producing a laser beam of a frequency selected to maximize the activation of only individual magnetic sublevels of the isotope of interest within the portion of its broadened energy domain most removed from other isotopes within the beam;
   (d) adjusting the polarization of the laser beam to further maximize the activation of only individual magnetic sublevels of the isotope of interest within the portion of its broadened energy domain most removed from other isotopes within the beam;
   (e) aiming the laser beam to strike the atomic beam within the magnetic field and traverse the path of the atomic beam whereby only the isotope of interest is activated by the laser beam;
   (f) producing a collimated and high intensity beam of electrons within the magnetic field aimed to strike the atomic beam which is struck simultaneously by the laser beam and at an energy level sufficient for ionizing the activated isotope of interest but not the ground state species; and,
   (g) disposing deflection means to have the atomic beam pass therethrough after being struck by the electron beam and deflect the ionized isotope from the remainder of the beam to form a separate stream composed only of the isotope of interest.

2. The method for producing a stream of ions of a selected isotope of an atom comprising the steps of:
   (a) producing an atomic beam containing the isotope of interest;
   (b) producing a magnetic field traversing the path of the atomic beam of sufficient intensity to split and shift the magnetic substrates of the various isotopes in such a way that a level of the isotope of interest is well separated from those of the others and at the same time achieving the collimation of an electron beam contained therein;
   (c) producing a laser beam of proper frequency to cause the activation of only the state of the isotope of interest which is most removed from other isotopes present in the the beam;
   (d) adjusting the polarization of the laser beam to further maximize the activation of only the state of the isotope of interest most removed from other isotopes in the beam;
   (e) aiming the laser beam to strike the atomic beam within the magnetic field and traverse the path of the atomic beam whereby only the isotope of interest is activated by the laser beam;
   (f) producing a collimated, energy selected, high-flux beam of electrons which propagates along the magnetic field and is aimed to strike the atomic beam while it is being simultaneously excited by the laser beam and at a kinetic energy sufficient for ionizing the activated isotope of interest but not the other unactivated isotope atoms; and,
   (g) disposing deflection means to have the atomic beam containing a mixture of ions and neutral atoms pass therethrough and deflect the ionized isotope from the remainder of the beam to form a separate stream composed only of the isotope of interest.

* * * * *